Dec. 2, 1952   D. WILKERSON   2,619,985
AUTOMATIC TANK DRAIN UNIT
Filed Nov. 15, 1948

Inventor
DEWEY WILKERSON

By [signature]
ATTORNEY

Patented Dec. 2, 1952

2,619,985

UNITED STATES PATENT OFFICE 2,619,985

AUTOMATIC TANK DRAIN UNIT

Dewey Wilkerson, Denver, Colo., assignor to Wilkerson Corporation, Denver, Colo., a corporation of Colorado Application November 15, 1948, Serial No. 60,031

1 Claim. (Cl. 137—688)

This invention relates to fluid pressure systems which incorporate a pressure reservoir or receiver and an intermittent pressure line. It provides a means for automatically removing moisture, oil, sludge, and foreign matter which accumulates in the reservoir.

An object of the invention is to provide a pressure responsive drain valve for compressed air tanks and the like, and an actuator therefor responsive to air line pressure. Other objects will be apparent to those skilled in the art.

It is to be understood that the instant disclosure is illustrative of one embodiment by which the invention is reduced to practice, and that any desired changes and modifications consistent with the scope of the invention as claimed may be made in the details of the structure as shown.

Figure 1:
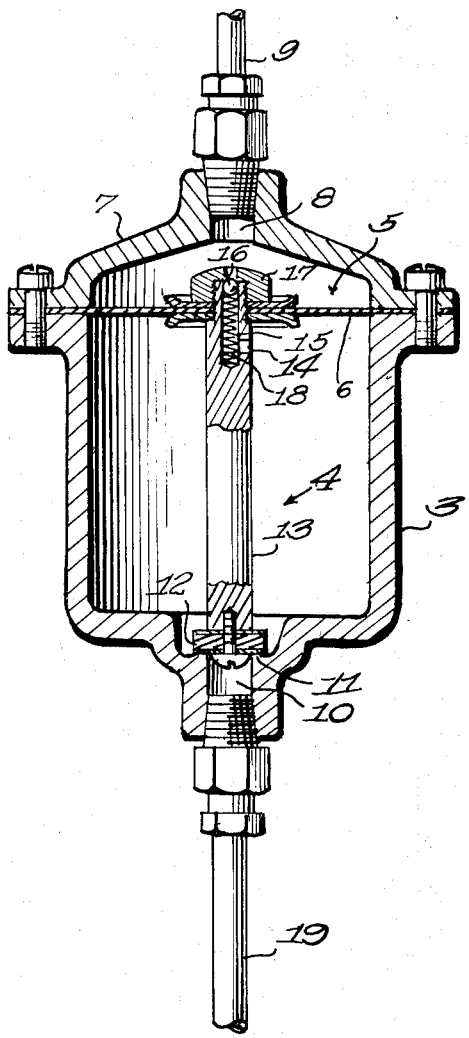
Figure 1 is substantially a longitudinal section through the actuator employed in my unit.

The actuator shown in Figure 1 comprises a body 3 having an impulse pressure chamber 4 and an air line pressure chamber 5 separated by a flexible diaphragm 6 marginally anchored between the body 3 and a head 7 secured thereto. The chamber 5 has an inlet 8 in constant open communication with an air line 9 in which the pressure is intermittent. The chamber 4 has an outlet 10 through the bottom wall of the body surrounded by a crown 11 which normally seats in closed relation a valve disc 12 attached to the lower end of a stem 13. At its upper end the stem passes through the diaphragm in fixed sealed connection therewith.

Communication between the chambers 4 and 5 is established through a port 14 in the stem below the diaphragm, which port opens to an axial bore 15 in the stem. The bore 15 opens at the upper end of the stem into the line chamber 5, and is controlled by a ball check valve 16 working in a seat 17 in threaded connection over the stem end. The check 16 is normally biased up against its seat by an expansion spring 18 housed in the stem bore.

Air under pressure from the line 9 enters the chamber 5 and acts on the diaphragm 6 to flex it downwardly and move the stem 13 to forcibly close the valve 12. At this point the pressure in chamber 5 unseats the ball 16 and air under line pressure passes through the stem bore 15 and port 14 into the impulse chamber 4. When the pressure is equal on both sides of the diaphragm the check valve closes and the valve 12 is held closed by pressure of air against its upper face and by gravity bias. Upon a release of air from the line 9 the pressure in chamber 5 drops and, as check valve 16 is closed, the greater pressure in chamber 4 forces the diagram upwardly to lift the stem 13 and open the valve 12. Air under pressure then passes from impulse chamber 4 through the outlet 10 and connected conduit 19 to operate the drain valve, later described. When pressure again builds up in line 9 and chamber 5, the chamber 4 is recharged as before at line pressure and the actuator is ready to repeat the cycle when air is next released from the line.

Figure 2:
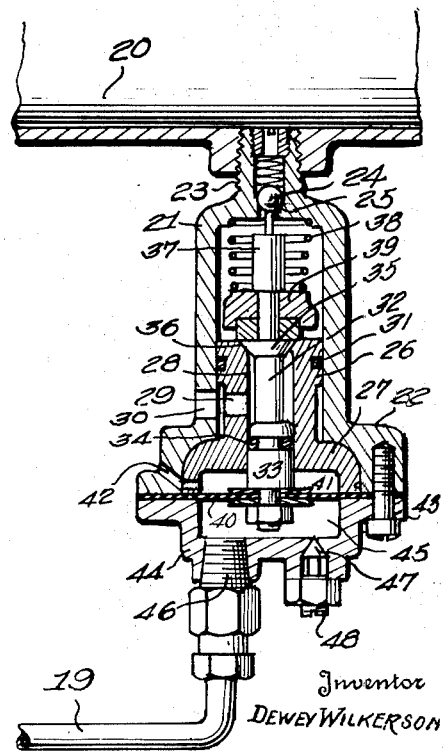
Figure 2 is a similar section through the drain valve used in connection with the actuator.

The drain valve shown in Figure 2 is attached to the bottom of an air storage tank 20. It comprises a cylindrical housing 21 having a belled lower end 22 and an attaching nipple 23 at its upper end. The nipple is axially bored for communication with the interior of the housing and carries a ball check valve 24 that is spring biased downwardly to closed position against a seat 25 at the inner end of the nipple bore. When the ball is lifted from its seat, water, oil, sludge and other foreign matter that has collected on the tank bottom will drain from the tank to the housing interior.

The valve further comprises a detachable insert positioned through the lower end of the housing so that it is readily removable for replacement. The insert consists of a piston-like plug 26 received within the housing and having at its lower end a bell 27 nested in close fitting engagement in the belled end of the housing. The plug 26 has an axial bore 28 extending therethrough from top to bottom. This bore opens through a discharge port 29 in the plug body to a drain aperture 30 in the housing wall. The plug carries a sealing ring 31 which provides a watertight engagement of the plug in the housing.

Within the plug bore 28 there is mounted for reciprocation a stem 32 which is of smaller diameter than the bore and which, at its lower end portion, is provided with a piston head 33 closely fitted within the bore and carrying a sealing ring 34. The stem 32 has at its upper end a valve head 35 which normally is closed against a seat 36 in the upper end of the plug bore. Above the valve head 35 the stem is provided with a plunger 37 in contact with the ball check 24, and the valve 35 is biased to closed position by an expansion coil spring 38 which bears at one end on the top wall of the housing, and at its other end against an abutment 39 on the stem.

The piston head 33 of the valve stem extends into the recess of the plug bell 27 and has secured on its lower end a flexible diaphragm 40 that covers the entire bell end of the housing and plug assembly to form a chamber 41 that is open to the atmosphere through a vent 42 in the bells 22 and 27. The marginal portion of the diaphragm is clamped between the end of the housing bell 22 and the peripheral edge flange 43 of a cup shaped head 44 that is bolted to the bell end of the housing. The internal recess of the head 44 provides a pressure chamber 45 beneath the diaphragm; and this chamber has an air inlet 46 in communication with the conduit 19 from the actuator. The chamber 45 exhausts to the atmosphere through a needle valve 47 having an adjusting screw 48.

When a charge of air is delivered from the impulse chamber 4 of the actuator by a release of air in the line 9, it passes through conduit 19 to the pressure chamber 45 of the air tank drain valve and forces the diaphragm upwardly to lift the stem 32 and open the valve 35. At the same time, the tip of the valve stem plunger 37 lifts the ball check 24 and the accumulation of water, oil, sludge and foreign matter on the tank bottom drains into the housing 21 whence it is discharged through the plug bore 28 and ports 29 and 30 to the atmosphere. The length of time the valves 35 and 24 remain open is determined by the setting of the needle valve 47 which is adjustable to regulate the rate at which air in the chamber 45 is exhausted to the atmosphere.

I claim:

A fluid pressure responsive drain valve comprising a substantially cylindrical housing having a bell mouth at one end and an axially bored attaching nipple at its other end, the housing having a drain vent port open to the atmosphere adjacent said mouth, a replaceable valve insert comprising an axially bored plug insertable through said mouth and closing the same to provide a valve chamber in the housing, the inner end of the plug bore constituting a valve seat, a valve stem reciprocable in the plug bore and having an intermediate portion diametrically reduced relative thereto, the body of said plug having a vent port in communication with the vent port in the housing and with the plug bore adjacent the reduced portion of the valve stem, a valve on said stem in the valve chamber cooperating with said valve seat, means in the valve chamber biasing said valve to closed position, a cup-shaped head detachably secured over the bell mouth of the housing, a flexible diaphragm carried by the valve stem and marginally anchored between the housing mouth and the head, said diaphragm providing a pressure chamber in the head and a relief chamber in the housing mouth, the relief chamber being open to the atmosphere, a piston on the valve stem in said relief chamber and reciprocable in the adjacent end of the plug bore to prevent passage of fluid from the plug bore to the relief chamber, said pressure chamber having a fluid inlet, and means for exhausting fluid from the pressure chamber at a regulated rate.

DEWEY WILKERSON.

REFERENCES CITED

The following references are of record in the file of this patent:

UNITED STATES PATENTS

| Number | Name | Date |
|---|---|---|
| 540,003 | Reed | May 28, 1895 |
| 1,077,795 | Bruns | Nov. 4, 1913 |
| 1,461,835 | Stroud | July 17, 1923 |
| 1,561,412 | Davis | Nov. 10, 1925 |
| 1,636,769 | Forman | July 26, 1927 |
| 1,811,202 | Ladshaw | June 23, 1931 |
| 2,083,584 | Wineman | June 15, 1937 |
| 2,083,695 | Dull | June 15, 1937 |
| 2,196,120 | Parker | Apr. 2, 1940 |
| 2,467,635 | Sogorka | Apr. 19, 1949 |
| 2,418,440 | White | Apr. 1, 1947 |
| 2,508,843 | Semak | May 23, 1950 |